(12) United States Patent
Lee et al.

(10) Patent No.: US 12,386,520 B2
(45) Date of Patent: Aug. 12, 2025

(54) SEMICONDUCTOR MEMORY DEVICE AND OPERATING METHOD OF THE SEMICONDUCTOR MEMORY DEVICE

(71) Applicant: SK hynix Inc., Icheon-si Gyeonggi-do (KR)

(72) Inventors: Dong Uk Lee, Icheon-si Gyeonngi-do (KR); Hae Chang Yang, Icheon-si Gyeonngi-do (KR); Hun Wook Lee, Icheon-si Gyeonngi-do (KR)

(73) Assignee: SK hynix Inc., Icheon-si Gyeonngi-do (KR)

( * ) Notice: Subject to any disclaimer, the term of this patent is extended or adjusted under 35 U.S.C. 154(b) by 30 days.

(21) Appl. No.: 18/192,959

(22) Filed: Mar. 30, 2023

(65) Prior Publication Data

US 2024/0118813 A1    Apr. 11, 2024

(30) Foreign Application Priority Data

Oct. 11, 2022    (KR) .................. 10-2022-0129881

(51) Int. Cl.
*G06F 3/06*    (2006.01)

(52) U.S. Cl.
CPC ............ *G06F 3/0619* (2013.01); *G06F 3/064* (2013.01); *G06F 3/0679* (2013.01)

(58) Field of Classification Search
CPC ...... G06F 3/0619; G06F 3/064; G06F 3/0679; G06F 3/061; G06F 3/0659; G11C 16/107; G11C 8/14; G11C 16/08; G11C 29/808
See application file for complete search history.

(56) References Cited

U.S. PATENT DOCUMENTS

| | | | | |
|---|---|---|---|---|
| 2020/0133501 | A1* | 4/2020 | Lee | G06F 3/0673 |
| 2021/0247933 | A1* | 8/2021 | Shin | G06F 3/064 |
| 2021/0349818 | A1* | 11/2021 | Li | G06F 9/544 |
| 2022/0066651 | A1* | 3/2022 | Miller | G11C 16/105 |
| 2022/0122670 | A1* | 4/2022 | Hwang | G11C 7/1063 |
| 2022/0276791 | A1* | 9/2022 | Miller | G06F 3/0679 |
| 2023/0112636 | A1* | 4/2023 | Doni | G06F 3/064 |
| | | | | 711/103 |
| 2023/0207017 | A1* | 6/2023 | Oh | G11C 16/32 |
| | | | | 365/189.011 |

(Continued)

FOREIGN PATENT DOCUMENTS

| | | |
|---|---|---|
| KR | 1020150047394 A | 5/2015 |
| KR | 102147628 B1 | 8/2020 |
| KR | 1020210076497 A | 6/2021 |

*Primary Examiner* — Zhuo H Li (74) *Attorney, Agent, or Firm* — WILLIAM PARK & ASSOCIATES LTD.

(57) ABSTRACT

A semiconductor memory device and a method of operating the semiconductor memory device are provided. The semiconductor memory device includes a memory block including a plurality of sub-blocks, a peripheral circuit configured to perform a program operation on the memory block, and control logic configured to control the peripheral circuit to perform the program operation on the memory block, wherein the program operation comprises programming to program normal data to a first sub-block, allocated to be a normal sub-block, among the plurality of sub-blocks, and programming parity data of the normal data to a second sub-block, allocated to be a backup block, among the plurality of sub-blocks.

19 Claims, 7 Drawing Sheets

(56) References Cited

U.S. PATENT DOCUMENTS

| | | | |
|---|---|---|---|
| 2023/0350576 A1* | 11/2023 | Shin | G06F 3/0629 |
| 2024/0020023 A1* | 1/2024 | Park | G06F 3/064 |
| 2024/0078031 A1* | 3/2024 | He | G06F 12/0246 |
| 2024/0282375 A1* | 8/2024 | Ryu | G06F 3/0658 |

\* cited by examiner

|  |  | ST1 | ST2 | ST3 | ST4 | ST5 | ST6 | ST7 | STn |
|---|---|---|---|---|---|---|---|---|---|
| SUB_1 | WL1 | D | D | D | D | D | D | D | D |
|  | WL2 | D | D | D | D | DD | DD | DD | DD |
|  | WL3 |  |  |  |  |  |  |  |  |
|  | WL4 |  |  |  |  |  |  |  |  |
|  | WL5 |  |  |  |  |  |  |  |  |
|  | WL6 |  |  |  |  |  |  |  |  |
|  | WL7 |  |  |  |  |  |  |  |  |
|  | WL8 |  |  |  |  |  |  |  |  |
| SUB_2 | WL9 | PD | PD | PD |  |  |  |  |  |
|  | WL10 | BD | BD | BD | BD | BD | BD | BD | BD |
|  | WL11 |  |  |  |  |  |  |  |  |
|  | WL12 |  |  |  |  |  |  |  |  |
|  | WL13 |  |  |  |  |  |  |  |  |
|  | WL14 |  |  |  |  |  |  |  |  |
|  | WL15 |  |  |  |  |  |  |  |  |
|  | WL16 |  |  |  |  |  |  |  |  |

D: Normal DATA
DD: Dummy DATA
PD: Parity DATA
BD: Backup DATA

FIG. 7

SEMICONDUCTOR MEMORY DEVICE AND OPERATING METHOD OF THE SEMICONDUCTOR MEMORY DEVICE

CROSS-REFERENCE TO RELATED APPLICATION

The present application claims priority under 35 U.S.C. § 119(a) to Korean patent application number 10-2022-0129881, filed on Oct. 11, 2022, in the Korean Intellectual Property Office, the entire disclosure of which is incorporated herein by reference.

BACKGROUND

1. Technical Field

Various embodiments of the present disclosure generally relate to an electronic device, and more particularly, to a semiconductor memory device and an operating method of the semiconductor memory device.

2. Related Art

A storage device may store data in response to the control of a host device, such as a computer, a smartphone, and a smartpad. Examples of the storage device may include, depending on a device where data is stored, a device for storing data in a magnetic disk, such as a hard disk drive (HDD) and a device for storing data in semiconductor memory, in particular, in nonvolatile memory, such as a solid state drive (SSD) or a memory card.

The storage device may include a memory device where data is stored and a memory controller storing data in the memory device. The memory device may be classified into a volatile memory device or a nonvolatile memory device. Examples of the nonvolatile memory device may include a Read Only Memory (ROM) device, a Programmable ROM (PROM) device, an Electrically Programmable ROM (EPROM) device, an Electrically Erasable and Programmable ROM (EEPROM) device, a flash memory device, a Phase-change RAM (PRAM) device, a Magnetic RAM (MRAM) device, a Resistive RAM (RRAM) device, and a Ferroelectric RAM (FRAM) device.

SUMMARY

According to an embodiment of the present disclosure, a semiconductor memory device may include a memory block including a plurality of sub-blocks, a peripheral circuit configured to perform a program operation on the memory block, and control logic configured to control the peripheral circuit to perform the program operation on the memory block, wherein the program operation programming to program normal data to a first sub-block, allocated to be a normal sub-block, among the plurality of sub-blocks, and programming parity data of the normal data to a second sub-block, allocated as a backup block, among the plurality of sub-blocks.

According to an embodiment of the present disclosure, a semiconductor memory device may include a memory cell array including a plurality of memory blocks, wherein each of the plurality of memory blocks includes at least one normal sub-block and a backup block, a peripheral circuit configured to perform a program operation on a selected memory block, among the plurality of memory blocks, and control logic configured to control the peripheral circuit to program normal data to the at least one normal sub-block during the program operation on the selected memory block, and to program backup data of the normal data to the backup block when a program fail occurs during the program operation.

According to an embodiment of the present disclosure, a method of operating a semiconductor memory device may include programming normal data to a first sub-block, among the first sub-block and a second sub-block that are included in a memory block, storing parity data of the normal data in the second sub-block, and storing backup data of the normal data in the second sub-block when a program fail occurs during the programming of the normal data.

DETAILED DESCRIPTION

Specific structural or functional descriptions disclosed herein are merely illustrative for the purpose of describing embodiments according to the concept of the present disclosure. Embodiments according to the concept of the present disclosure may be implemented in various forms and should not be construed as being limited to the specific embodiments set forth herein.

Hereinafter, embodiments are described with reference to the accompanying drawings in order for those skilled in the art to be able to implement the technical spirit of the present disclosure.

Various embodiments are directed to a semiconductor memory device capable of improving reliability of a program operation by utilizing, as a backup block, one of a plurality of sub-blocks included in one memory block during the program operation, and a method of operating the semiconductor memory device.

Figure 1:
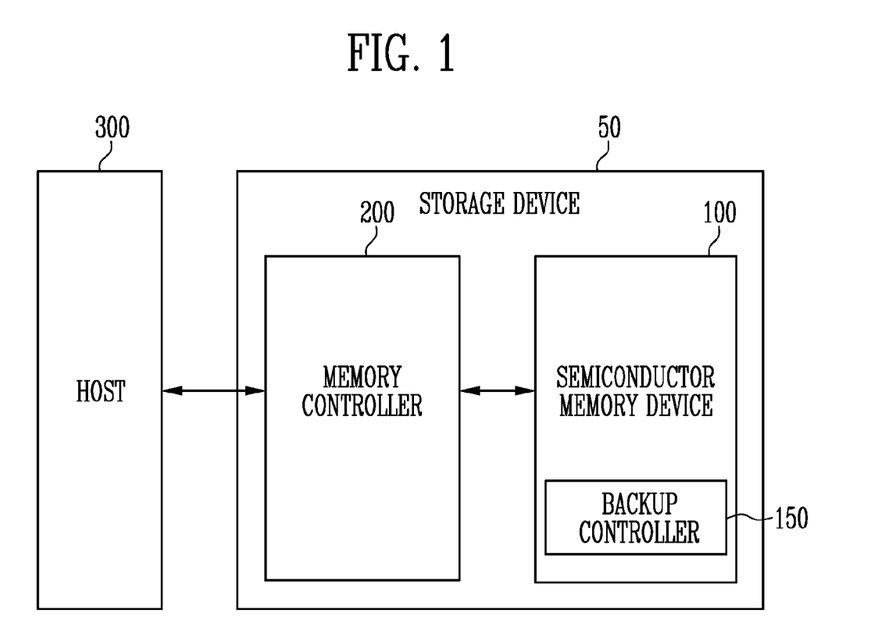
FIG. 1 is a block diagram illustrating a storage device.

FIG. 1 is a block diagram illustrating a storage device 50.

Referring to FIG. 1, the storage device 50 may include a semiconductor memory device 100 and a memory controller 200.

The storage device 50 may store data in response to the control of a host 300. Examples of the storage device 50 may include a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface corresponding to a communication method with the host 300. For example, the storage device 50 may be configured as one of various types of storage devices, such as a Solid State Drive (SSD), a multimedia card in the form of a MultiMedia Card (MMC), an embedded MMC (eMMC), a Reduced-Size MMC (RS-MMC), or a micro-MMC, a secure digital card in the form of a Secure Digital (SD) card, a mini-SD card, or a micro-SD card, a Universal Serial Bus (USB) storage device, a Universal Flash Storage (UFS) device, a Personal Computer Memory Card International Association (PCMCIA) card type storage device, a Peripheral Component Interconnect (PCI) card type storage device, a PCI Express (PCI-e) card type storage device, a Compact Flash (CF) card, a smart media card, and a memory stick.

The storage device 50 may be manufactured as one of various types of packages. For example, the storage device 50 may be manufactured by any one of various package types, such as a package on package (POP), a system in package (SIP), a system on chip (SOC), a multi-chip package (MCP), a chip on board (COB), a wafer-level fabricated package (WFP), and a wafer-level stack package (WSP).

The semiconductor memory device 100 may store data. The semiconductor memory device 100 may operate in response to the control of the memory controller 200. The semiconductor memory device 100 may include a memory cell array including a plurality of memory cells storing data. The memory cell array may include a plurality of memory blocks. Each of the memory blocks may include a plurality of memory cells, and the plurality of memory cells may form a plurality of pages. A page may be a unit for storing data in the semiconductor memory device 100 or reading data stored in the semiconductor memory device 100. According to an embodiment, each of the memory blocks may include a plurality of sub-blocks. One of the plurality of sub-blocks may be allocated to be a backup block and the remaining sub-blocks, except for the one sub-block allocated to be the backup block, may be allocated to be normal sub-blocks.

According to an embodiment, the semiconductor memory device 100 may be Double Data Rate Synchronous Dynamic Random Access Memory (DDR SDRAM), Low Power Double Data Rate 4 (LPDDR4) SDRAM, Graphics Double Data Rate (GDDR) SDRAM, Low Power DDR (LPDDR), Rambus Dynamic Random Access Memory (RDRAM), NAND flash memory, Vertical NAND flash memory, NOR flash memory, Resistive Random Access Memory (RRAM), Phase-Change Random Access Memory (PRAM), Magnetoresistive Random Access Memory (MRAM), Ferroelectric Random Access Memory (FRAM), or Spin-Transfer Torque Random Access Memory (STT-RAM). By way of example, it is assumed that the semiconductor memory device 100 is a NAND flash memory in the context of the following description.

The semiconductor memory device 100 may have a two-dimensional or three-dimensional array structure. Hereinafter, a three-dimensional array structure is described as an embodiment. However, embodiments of the present disclosure are not limited to the three-dimensional array structure. The embodiments of the present disclosure may be applied not only to a flash memory device in which a charge storage layer includes a conductive floating gate (FG) but also to a charge trap flash (CTF) memory device in which a charge storage layer includes an insulating layer.

According to an embodiment, the semiconductor memory device 100 may operate based on a Single-Level Cell (SLC) method in which one memory cell stores one bit of data. Alternatively, the semiconductor memory device 100 may operate based on a method in which one memory cell stores at least two bits of data. For example, the semiconductor memory device 100 may operate based on a Multi-Level Cell (MLC) method in which one memory cell stores two bits of data, a Triple-Level Cell (TLC) method in which one memory cell stores three bits of data, or a Quadruple-Level Cell (QLC) method in which one memory cell stores four bits of data.

The semiconductor memory device 100 may receive a command and an address from the memory controller 200 and may access an area of the memory cell array selected by the address. That is, the semiconductor memory device 100 may perform an operation corresponding to the command on the area of the memory cell array selected by the address. For example, the semiconductor memory device 100 may perform a write operation (or a program operation), a read operation, or an erase operation according to the received command. For example, when a program command is received, the semiconductor memory device 100 may program data into the area of the memory cell array selected by the address. When a read command is received, the semiconductor memory device 100 may read data from the area of the memory cell array selected by the address. When an erase command is received, the semiconductor memory device 100 may erase data stored in the area of the memory cell array selected by the address.

According to an embodiment, the semiconductor memory device 100 may include a backup controller 150. When the semiconductor memory device 100 performs a program operation of the normal sub-blocks, the backup controller 150 may program parity of a normal data, to be programmed to normal sub-blocks of a selected memory block, to a backup block. In addition, when a program fail occurs due to a sudden loss of power or the like during the program operation of the normal sub-blocks, the backup controller 150 may program normal data of a page on which the program operation is being performed to the backup block.

Accordingly, according to an embodiment, because data and parity, normally programmed to a page of a normal sub-block on which a program operation is being performed, are stored as backup data in a backup block, the data of the page on which the program operation is being performed may be recovered based on the backup data stored in the backup block when a program fail occurs due to a sudden loss of power.

When a power voltage is applied to the storage device 50, the memory controller 200 may execute firmware. When the semiconductor memory device 100 is a flash memory device, the memory controller 200 may execute firmware, such as a Flash Translation Layer (FTL) for controlling the communication between the host 300 and the semiconductor memory device 100.

According to an embodiment, the memory controller 200 may include firmware (not shown) that receives data and a logical block address (LBA) from the host 300 and translates the LBA into a physical block address (PBA) indicating addresses of memory cells, in which data is to be stored, included in the semiconductor memory device 100. In addition, the memory controller 200 may store a logical-physical address mapping table configuring a mapping relationship between the LBA and the PBA in buffer memory.

The memory controller 200 may control the semiconductor memory device 100 to perform a program operation, a read operation, an erase operation, or the like in response to a request from the host 300. For example, when the memory controller 200 receives a program request from the host 300, the memory controller 200 may switch the program request to a program command and may provide the program command, a physical block address (PBA), and data to the semiconductor memory device 100. When the memory controller 200 receives a read request, along with a logical block address (LBA), from the host 300, the memory controller 200 may switch the read request to a read command, select a physical block address (PBA) corresponding to the LBA, and then provide the read command and the PBA to the semiconductor memory device 100. When the memory controller 200 receives an erase request, along with a logical block address (LBA), from the host 300, the memory controller 200 may switch the erase request to an erase command, select a physical block address (PBA) corresponding to the LBA, and then provide the erase command and the PBA to the semiconductor memory device 100.

According to an embodiment, the memory controller 200 may generate and transmit a program command, an address, and data to the semiconductor memory device 100 independent of a request from the host 300. For example, the memory controller 200 may provide a command, an address, and data to the semiconductor memory device 100 to perform background operations, such as a program operation for wear leveling and a program operation for garbage collection.

According to an embodiment, the storage device 50 may further include buffer memory (not shown). The memory controller 200 may control data exchange between the host 300 and the buffer memory. Alternatively, the memory controller 200 may temporarily store system data for controlling the semiconductor memory device 100 in the buffer memory. For example, the memory controller 200 may temporarily store data input from the host 300 in the buffer memory and may transfer the data temporarily stored in the buffer memory to the semiconductor memory device 100.

According to various embodiments, the buffer memory may serve as operational memory or cache memory of the memory controller 200. The buffer memory may store codes or commands executed by the memory controller 200. Alternatively, the buffer memory may store data processed by the memory controller 200.

According to an embodiment, the buffer memory may include Dynamic Random Access Memory (DRAM), such as Double Data Rate Synchronous Dynamic Random Access Memory (DDR SDRAM), Double Data Rate 4 (DDR4) SDRAM, Low Power Double Data Rate 4 (LPDDR4) SDRAM, Graphics Double Data Rate (GDDR) SDRAM, Low Power DDR (LPDDR), or Rambus Dynamic Random Access Memory (RDRAM), or Static Random Access Memory (SRAM).

According to various embodiments, the buffer memory may be outside of the storage device 50 and may be coupled to the storage device 50. Volatile memory devices externally coupled to the storage device 50 may serve as the buffer memory.

According to an embodiment, the memory controller 200 may control at least two memory devices. The memory controller 200 may control the memory devices according to an interleaving scheme to improve operational performance.

The host 300 may communicate with the storage device 50 using at least one of various communication standards or interfaces, such as Universal Serial Bus (USB), Serial Advanced Technology Attachment (SATA), Serial Attached SCSI (SAS), High Speed Interchip (HSIC), Small Computer System Interface (SCSI), Peripheral Component Interconnect (PCI), PCI Express (PCIe), NonVolatile Memory express (NVMe), Universal Flash Storage (UFS), Secure Digital (SD), a MultiMedia Card (MMC), an embedded MMC (eMMC), a Dual In-line Memory Module (DIMM), a Registered DIMM (RDIMM), and a Load Reduced DIMM (LRDIMM).

Figure 2:
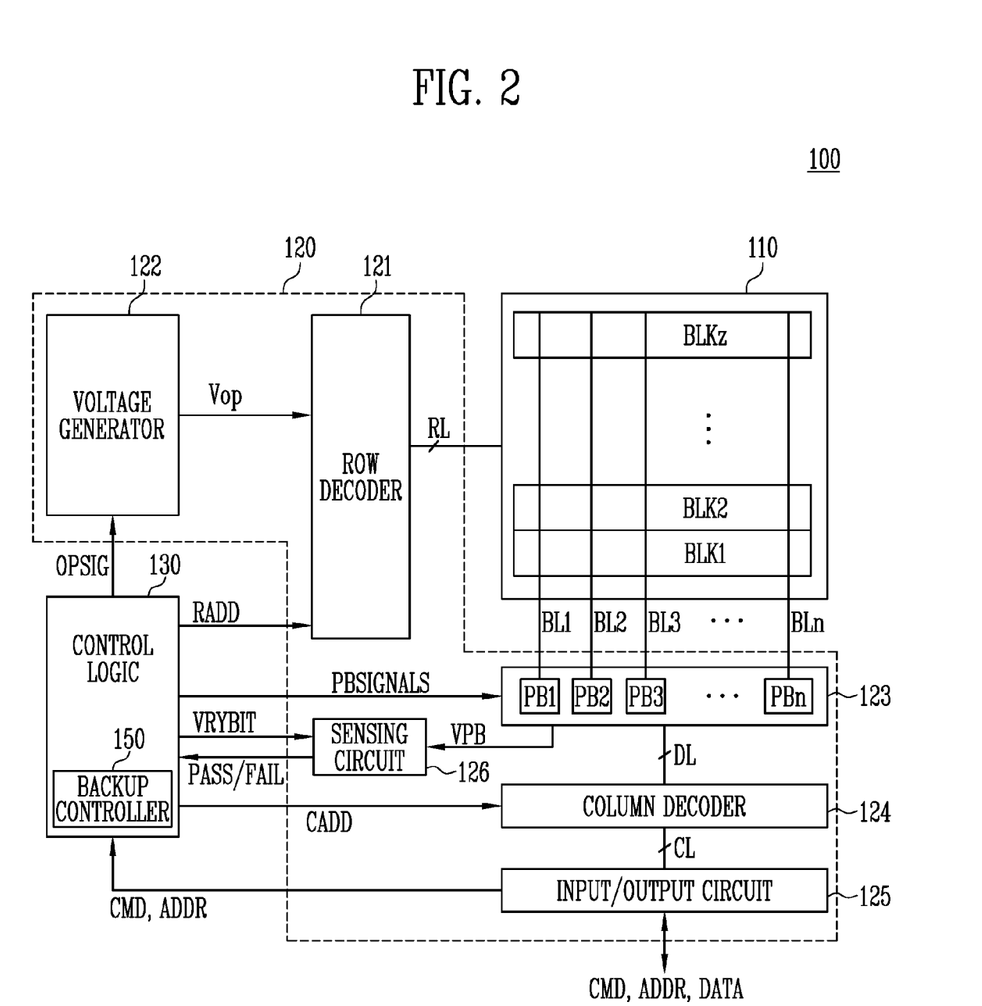
FIG. 2 is a diagram illustrating a structure of a semiconductor memory device shown in FIG. 1.

FIG. 2 is a diagram illustrating a structure of the semiconductor memory device 100 shown in FIG. 1.

Referring to FIG. 2, the semiconductor memory device 100 may include a memory cell array 110, a peripheral circuit 120, and control logic 130.

The memory cell array 110 may include a plurality of memory blocks BLK1 to BLKz. The plurality of memory blocks BLK1 to BLKz may be coupled to a row decoder 121 through row lines RL. The plurality of memory blocks BLK1 to BLKz may be coupled to a page buffer group 123 through bit lines BL1 to BLn. Each of the plurality of memory blocks BLK1 to BLKz may include a plurality of memory cells. According to an embodiment, the plurality of memory cells may be nonvolatile memory cells. Memory cells coupled to the same word line may be defined as one page. Therefore, each memory block may include a plurality of pages. According to an embodiment, each of the plurality of memory blocks BLK1 to BLKz may be configured to include a plurality of sub-blocks. One of the plurality of sub-blocks may be allocated to be a backup block and the remaining sub-blocks, except for the one sub-block allocated to be the backup block, may be allocated to be normal sub-blocks.

The row lines RL may include at least one source select line, a plurality of word lines, and at least one drain select line.

Each of the memory cells included in the memory cell array 110 may include a Single-Level Cell (SLC) storing one bit of data, a Multi-Level Cell (MLC) storing two bits of data, a Triple-Level Cell (TLC) storing three bits of data, or a Quadruple-Level Cell (QLC) storing four bits of data.

The peripheral circuit 120 may be configured to perform a program operation, a read operation, or an erase operation on a selected area of the memory cell array 110 in response to the control of the control logic 130. The peripheral circuit 120 may drive the memory cell array 110. For example, in response to the control of the control logic 130, the peripheral circuit 120 may apply various operating voltages to the row lines RL and the bit lines BL1 to BLn or may discharge the applied voltages.

The peripheral circuit 120 may include the row decoder 121, a voltage generator 122, the page buffer group 123, a column decoder 124, an input/output circuit 125, and a sensing circuit 126.

The row decoder 121 may be coupled to the memory cell array 110 through the row lines RL. The row lines RL may include at least one source select line, a plurality of word lines, and at least one drain select line. According to an embodiment, the word lines may include normal word lines and dummy word lines. According to an embodiment, the row lines RL may further include a pipe select line.

The row decoder 121 may decode a row address RADD received from the control logic 130. The row decoder 121 may select at least one memory block, among the memory blocks BLK1 to BLKz, according to the decoded address. The row decoder 121 may select at least one word line of the selected memory block to apply voltages generated by the voltage generator 122 to at least one word line according to the decoded address.

For example, during a program operation, the row decoder 121 may apply a program voltage to the selected word line and a program pass voltage to unselected word lines. The program pass voltage may have a lower voltage level than the program voltage. During a program verify operation, the row decoder 121 may apply a verify voltage to the selected word line and a verify pass voltage to the unselected word lines. The verify pass voltage may have a higher voltage level than the verify voltage. During a read operation, the row decoder 121 may apply a read voltage to the selected word line and a read pass voltage to the unselected word lines. The read pass voltage may have a higher voltage level than the read voltage.

According to an embodiment, an erase operation of the semiconductor memory device 100 may be performed in units of memory blocks or in units of sub-blocks. During an erase operation performed in units of memory blocks, the row decoder 121 may select one memory block according to the decoded address and may apply a ground voltage to word lines coupled to the selected memory block. During an erase operation performed in units of sub-blocks, the row decoder 121 may select one sub-block according to the decoded address and may apply a ground voltage to word lines coupled to the selected sub-block.

The voltage generator 122 may operate in response to the control of the control logic 130. The voltage generator 122 may be configured to generate a plurality of voltages by using an external power voltage supplied to the semiconductor memory device 100. More specifically, the voltage generator 122 may generate various operating voltages Vop applied to perform program, read, and erase operations in response to an operation signal OPSIG. For example, the voltage generator 122 may generate a program voltage, a verify voltage, a pass voltage, a read voltage, and an erase voltage in response to the control of the control logic 130.

According to an embodiment, the voltage generator 122 may generate an internal power voltage by regulating an external power voltage. The internal power voltage generated by the voltage generator 122 may be used as an operating voltage of the semiconductor memory device 100.

According to an embodiment, the voltage generator 122 may generate a plurality of voltages by using the external power voltage or the internal power voltage.

For example, the voltage generator 122 may include a plurality of pumping capacitors that receive the internal power voltage and generate a plurality of voltages by selectively activating the plurality of pumping capacitors in response to the control of the control logic 130.

The plurality of generated voltages may be supplied to the memory cell array 110 by the row decoder 121.

The page buffer group 123 may include first to nth page buffers PB1 to PBn. The first to nth page buffers PB1 to PBn may be coupled to the memory cell array 110 through the first to nth bit lines BL1 to BLn, respectively. The first to nth page buffers PB1 to PBn may operate in response to the control of the control logic 130. More specifically, the first to nth page buffers PB1 to PBn may operate in response to page buffer control signals PBSIGNALS. For example, the first to nth page buffers PB1 to PBn may temporarily store data received through the first to nth bit lines BL1 to BLn or may sense voltages or currents of the first to nth bit lines BL1 to BLn during a read or verify operation.

More specifically, during a program operation, the first to nth page buffers PB1 to PBn may transfer data DATA received through the input/output circuit 125 to selected memory cells through the first to nth bit lines BL1 to BLn when a program voltage is applied to a selected word line. Memory cells of a selected page may be programmed according to the transferred data DATA. During a program verify operation, the first to nth page buffers PB1 to PBn may read page data from the selected memory cells by sensing a voltage or a current received through the first to nth bit lines BL1 to BLn.

During a read operation, the first to nth page buffers PB1 to PBn may read the data DATA from the memory cells of the selected page through the first to nth bit lines BL1 to BLn and may output the read data DATA to the input/output circuit 125 in response to the control of the column decoder 124.

During an erase operation, the first to nth page buffers PB1 to PBn may float the first to nth bit lines BL1 to BLn or may apply an erase voltage to the first to nth bit lines BL1 to BLn.

The column decoder 124 may transfer data between the input/output circuit 125 and the page buffer group 123 in response to a column address CADD. For example, the column decoder 124 may exchange data with the first to nth page buffers PB1 to PBn through data lines DL or may exchange data with the input/output circuit 125 through column lines CL.

The input/output circuit 125 may transfer a command CMD and an address ADDR received from the memory controller 200, shown in FIG. 1, to the control logic 130 or may exchange the data DATA with the column decoder 124.

The sensing circuit 126 may generate a reference current in response to an allowable bit VRYBIT signal and may compare a sensing voltage VPB received from the page buffer group 123 with a reference voltage generated by the reference current to output a pass signal PASS or a fail signal FAIL during a read operation or a verify operation.

The control logic 130 may control the peripheral circuit 120 by outputting the operation signal OPSIG, the row address RADD, the page buffer control signals PBSIGNALS, and the allowable bit VRYBIT in response to the command CMD and the address ADDR. For example, the control logic 130 may control a read operation of a selected memory block in response to a sub-block read command and an address. In addition, the control logic 130 may control an erase operation of a selected sub-block included in the selected memory block in response to a sub-block erase command and the address. In addition, the control logic 130 may determine whether a verify operation passes or fails in response to the pass signal PASS or the fail signal FAIL.

According to an embodiment, the control logic 130 may include the backup controller 150. According to another embodiment, the backup controller 150 may be outside of the control logic 130.

According to an embodiment, the backup controller 150 may control the peripheral circuit 120 to program the parity of the normal data to be programmed to the normal sub-blocks during a program operation of the normal sub-blocks of the selected memory block. In addition, when a program fail occurs due to a sudden loss of power or the like during the program operation of the normal sub-blocks, the backup controller 150 may control the peripheral circuit 120 to program the normal data of the page on which the program operation is being performed to the backup block.

When the semiconductor memory device 100 performs the program operation in a Multi-Level Cell (MLC) method, data to be programmed to the selected page of the normal sub-blocks may be a least significant bit (LSB) page data and a most significant bit (MSB) page data. Alternatively, when the semiconductor memory device 100 performs the program operation in a Triple-Level Cell (TLC) method, data to be programmed to the selected page of the normal sub-blocks may be a least significant bit (LSB) page data, a central significant bit (CSB) page data, and a most significant bit (MSB) page data.

According to an embodiment, when the semiconductor memory device 100 performs the program operation on normal sub-blocks based on a Multi-Level Cell (MLC) method, backup data to be stored in a backup block may be a LSB page data or a LSB page data and a MSB page data of a page of a normal sub-block on which the program operation is being performed. Alternatively, when the semiconductor memory device 100 performs the program operation on the normal sub-blocks based on a Triple-Level Cell (TLC) method, backup data to be stored in a backup block may be a LSB page data or a LSB page data, a CSB page data, and a MSB page data of a page of a normal sub-block on which the program operation is being performed.

According to an embodiment, when a program fail occurs, the backup controller 150 may control the peripheral circuit 120 to read the backup data stored in the backup block during a recovery operation. The backup controller 150 may control the peripheral circuit 120 to continuously perform the program operation on the page of the normal sub-block on which the program fail occurs, using the backup data read during the recovery operation.

According to an embodiment, when the recovery operation is completed, the backup controller 150 may control the peripheral circuit 120 to erase the backup data stored in the backup block.

As described above, when the semiconductor memory device 100 performs the program operation, the backup controller 150 may control the peripheral circuit 120 to store parity in a backup block and when a program fail occurs due to a sudden loss of power, the backup controller 150 may back up and store, in a backup block, normal data to be stored in a page of a normal sub-block on which the program operation is being performed.

Figure 3:
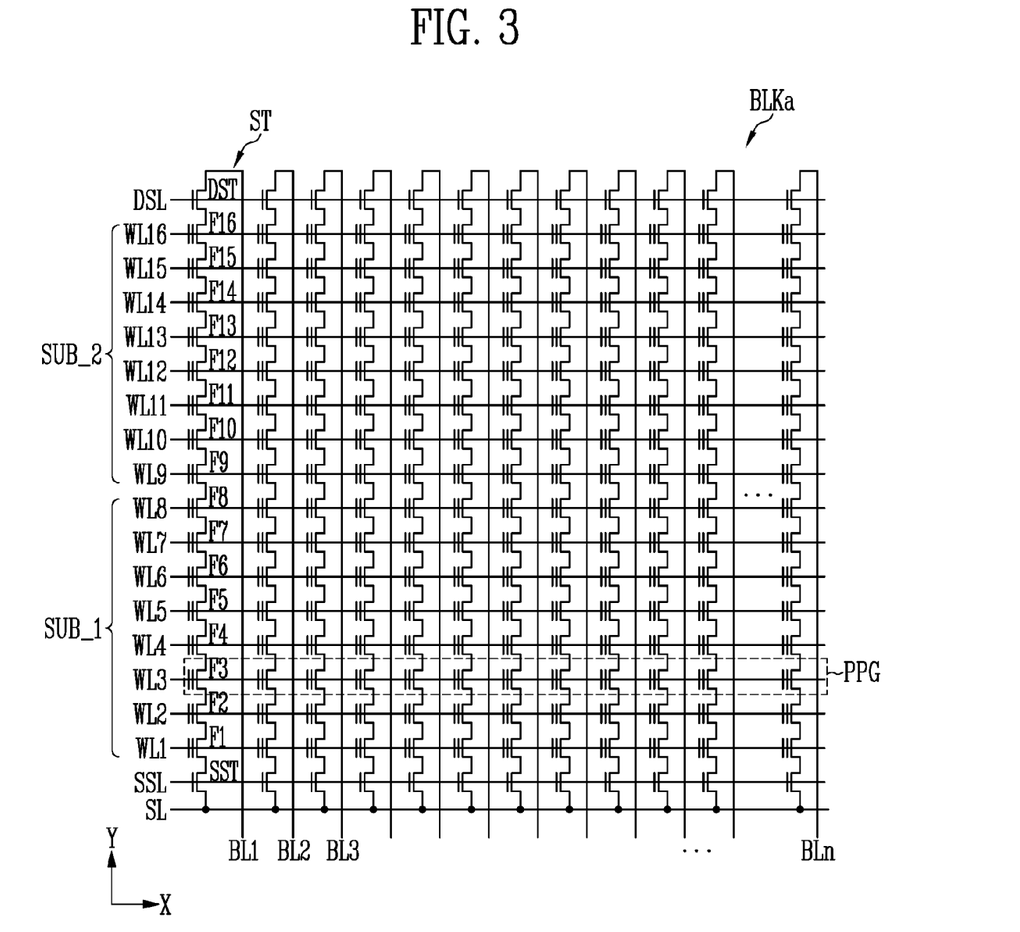
FIG. 3 is a diagram illustrating one memory block, among a plurality of memory blocks, included in a memory cell array shown in FIG. 2.

FIG. 3 is a diagram illustrating one memory block BLKa, among the plurality of memory blocks BLK1 to BLKz, included in the memory cell array 110, shown in FIG. 2.

Referring to FIGS. 2 and 3, FIG. 3 is a circuit diagram showing one memory block BLKa, among the plurality of memory blocks BLK1 to BLKz, included in the memory cell array 110, shown in FIG. 2.

A first select line, word lines, and a second select line, arranged to be parallel to each other, may be coupled to the memory block BLKa. For example, the word lines may be arranged to be parallel to each other between the first and second select lines. The first select line may be a source select line SSL, and the second select line may be a drain select line DSL.

More specifically, the memory block BLKa may include a plurality of memory strings coupled between the bit lines BL1 to BLn and a source line SL. The bit lines BL1 to BLn may be coupled to the memory strings, respectively, and the source line SL may be coupled in common to the memory strings. Because the memory strings may be configured in the same manner, a memory string ST coupled to the first bit line BL1 is described in detail as an example.

The memory string ST may include a source select transistor SST, a plurality of memory cells F1 to F16, and a drain select transistor DST coupled in series between the source line SL and the first bit line BL1. However, the embodiment is not limited thereto. Each memory string ST may include at least one source select transistor SST, at least one drain select transistor DST, and more memory cells than the memory cells F1 to F16 shown in FIG. 3.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of source select transistors included in different memory strings may be coupled to the source select line SSL, gates of drain select transistors included in different memory strings may be coupled to the drain select line DSL, and gates of the memory cells F1 to F16 included in different memory strings may be coupled to a plurality of word lines WL1 to WL16, respectively. A group of memory cells coupled to the same word line, among memory cells included in different memory strings, may be referred to as a physical page (PPG). Therefore, the memory block BLKa may include as many physical pages PPG as the number of the word lines WL1 to WL16.

A single memory cell may store one bit of data. Typically, this memory cell may be called a Single-Level Cell (SLC). A single PPG including SLCs may store one logical page (LPG) of data. A single LPG of data may include as many bits of data as the number of memory cells included in a single PPG. Alternatively, a single memory cell may store two or more bits of data. Typically, this memory cell may be called a Multi-Level Cell (MLC). A single PPG including MLCs may store two or more LPGs of data.

A single memory cell that stores two or more bits of data may be called a Multi-Level Cell (MLC). However, recently, as the number of bits of data stored in a single memory cell increases, the MLC may refer to a memory cell storing two bits of data, while a memory cell storing three or more bits of data is called a Triple-Level Cell (TLC), and a memory cell storing four or more bits of data is called a Quadruple-Level Cell (QLC). Various types of memory cells storing multiple bits of data, other than the memory cells described above, have been developed, and this embodiment described with reference to FIG. 3 may be applied to the semiconductor memory device 100 storing two or more bits of data.

According to another embodiment, a memory block may have a three-dimensional structure. Each memory block may include a plurality of memory cells stacked over a substrate. The plurality of memory cells may be arranged in a +X direction, a +Y direction, and a +Z direction.

One memory block BLKa may be configured to include a plurality of sub-blocks SUB_1 and SUB_2. According to an embodiment, it is illustrated that one memory block BLKa includes a first sub-block SUB_1 and a second sub-block SUB_2. However, embodiments of the present disclosure are not limited to the above-described embodiment and one memory block BLKa may be configured to include two or more sub-blocks.

According to an embodiment, the first sub-block SUB_1 may include the memory cells F1 to F8 corresponding to a first word line group including the word lines WL1 to WL8, among the plurality of word lines coupled to one memory block BLKa and the second sub-block SUB_2, may include the memory cells F9 to F16 corresponding to a second word line group including the word lines WL9 to WL16, among the plurality of word lines coupled to one memory block BLKa.

According to an embodiment, the first sub-block SUB_1 may be allocated to be a normal sub-block and the second sub-block SUB_2 may be allocated to be a backup block. When one memory block BLKa is configured to include three or more sub-blocks, one of the three or more sub-blocks may be allocated to be a backup block and the remaining two or more sub-blocks, except for the sub-block allocated to be the backup block, may be allocated to be normal sub-blocks.

According to an embodiment, during a program operation, normal data may be programmed to a sub-block allocated to be a normal sub-block and backup data may be programmed to a sub-block allocated to be a backup block. The backup data may include the normal data to be programmed to the sub-block allocated to be the normal sub-block and parity of the normal data.

According to an embodiment, one memory block may include a plurality of memory strings that share a plurality of word line groups, and each of a plurality of sub-blocks included in the one memory block may be configured to include memory cells corresponding to one word line group, among memory cells included in the plurality of memory strings.

Figure 4:
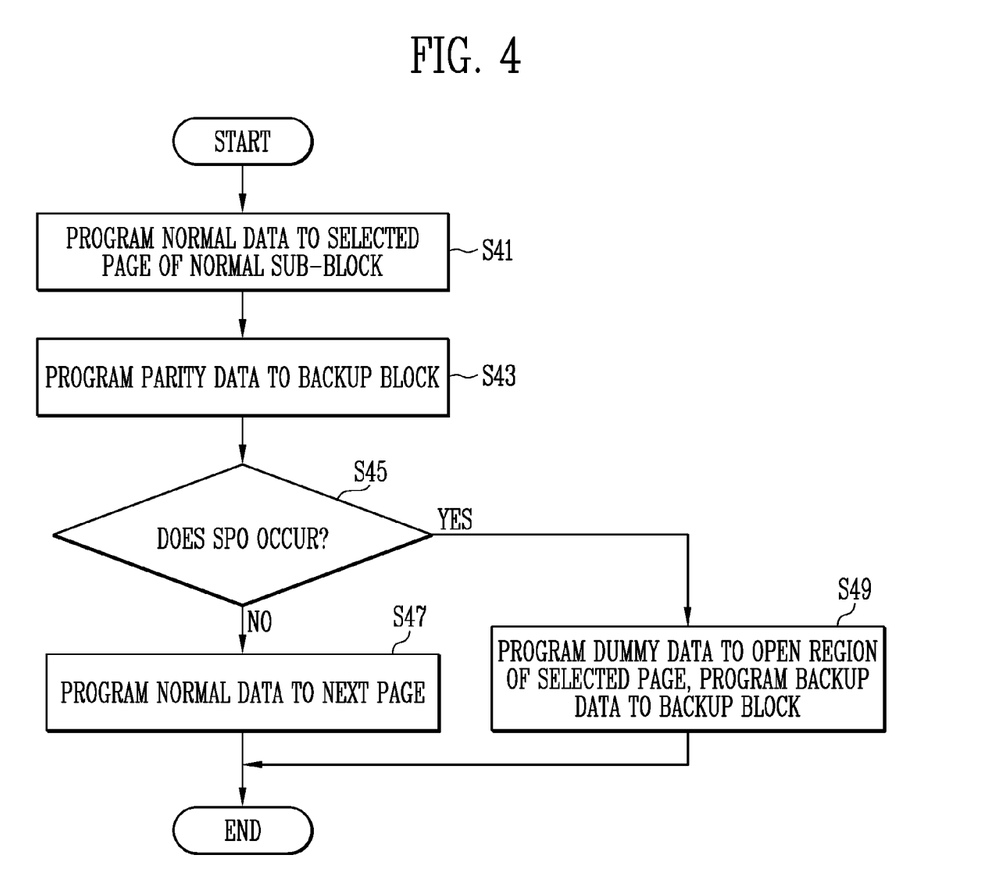
FIG. 4 is a flowchart illustrating a program operation of a semiconductor memory device according to an embodiment.

FIG. 4 is a flowchart illustrating a program operation of a semiconductor memory device according to an embodiment.

Figure 5:
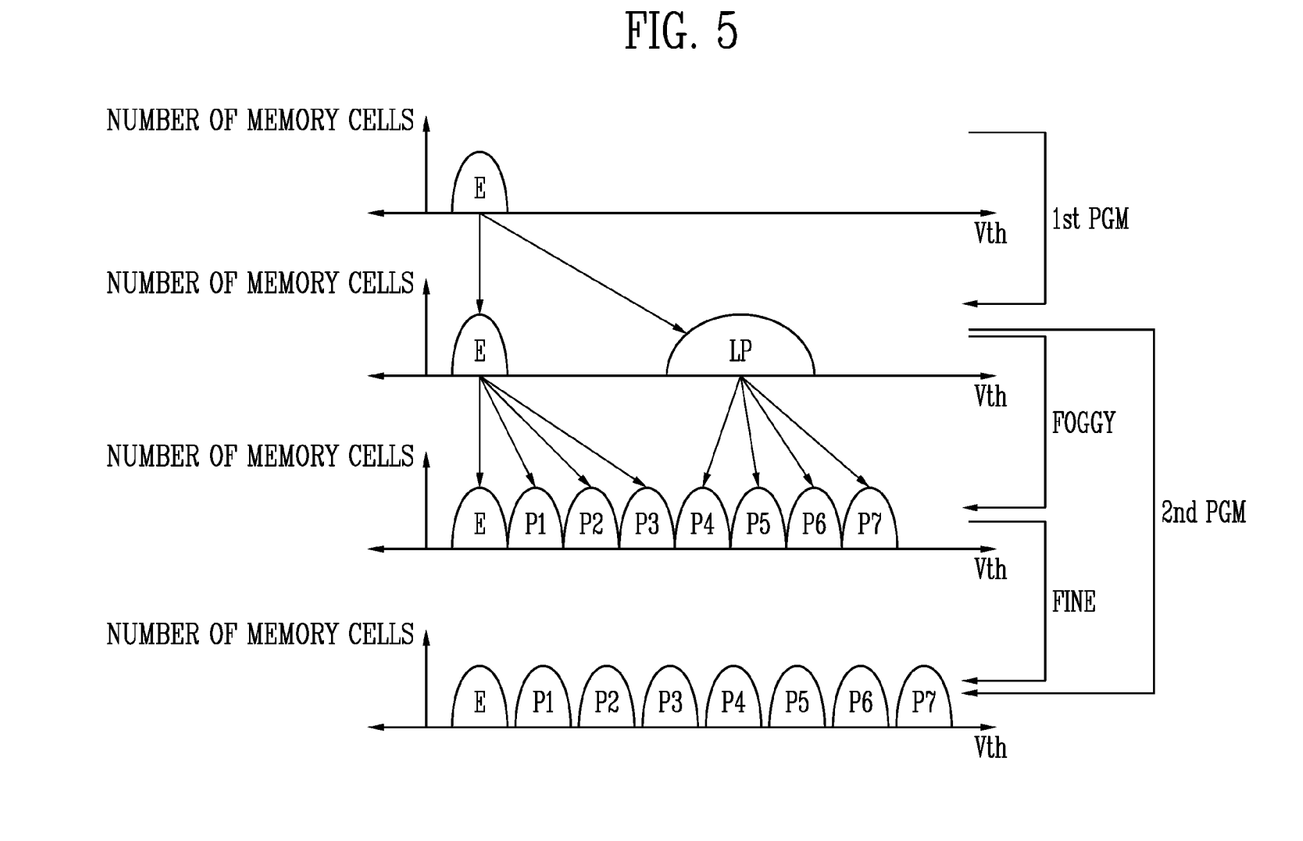
FIG. 5 is a distribution chart of threshold voltages of memory cells illustrating a foggy-fine program operation according to an embodiment.

FIG. 5 is a distribution chart of threshold voltages of memory cells illustrating a foggy-fine program operation according to an embodiment.

Figure 6:
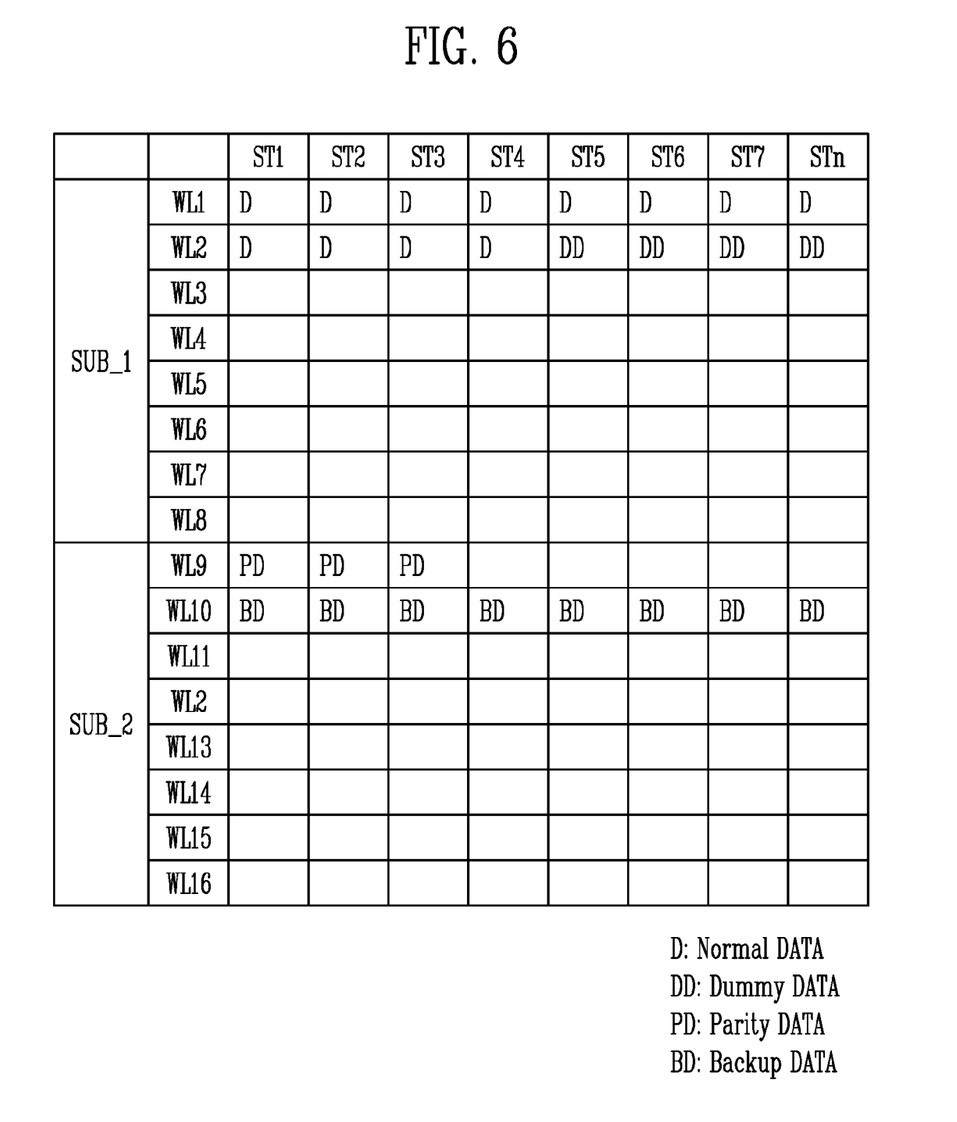
FIG. 6 is a diagram illustrating data to be programmed to a normal sub-block and a backup block during a program operation according to an embodiment.

FIG. 6 is a diagram illustrating data to be programmed to a normal sub-block and a backup block during a program operation according to an embodiment.

A method of operating a semiconductor memory device according to an embodiment is described below with reference to FIGS. 4 to 6.

At step S41, normal data may be programmed to a selected page, among a plurality of pages, included in a normal sub-block of a selected memory block, among the plurality of memory blocks BLK1 to BLKz. For example, the control logic 130 may control the peripheral circuit 120 to program the normal data to the selected page, among the plurality of pages, included in the normal sub-block of the selected memory block.

The selected memory block may be configured to include the plurality of sub-blocks SUB_1 and SUB_2 as shown in FIG. 3. According to an embodiment, the first sub-block SUB_1 may be allocated to be a normal sub-block, and the second sub-block SUB_2 may be allocated to be a backup block. Accordingly, a program operation on a selected page of the first sub-block SUB_1, for example, a page corresponding to the word line WL1, may be performed.

Referring to FIG. 6, normal data D may be programmed to a page including memory cells corresponding to the word line WL1, among memory cells included in a plurality of memory strings ST1 to STn, included in the first sub-block SUB_1.

A program operation of programming normal data to a selected page of the normal sub-block, that is, the first sub-block SUB_1, may be performed as a foggy-fine program operation.

Referring to FIG. 5, a horizontal axis refers to a level of a threshold voltage Vth of memory cells and a vertical axis refers to the number of memory cells in FIG. 5. According to an embodiment, it is assumed that the memory cells are programmed based on a Triple-Level Cell (TLC) method in FIG. 5. However, the embodiment shown in FIG. 5 may also be applied to a case in which the memory cells are programmed based on a Single-Level Cell (SLC) method, a Multi-Level Cell (MLC) method, or a Quadruple-Level Cell (QLC) method.

Referring to FIG. 5, the memory cells may be in an erase state E before the memory cells are programmed. That is, the memory cells in the erase state E may be programmed to one of first to seventh program states P1 to P7, that is, target program states, by a foggy-fine program operation.

First, least significant bit (LSB) page data may be programmed to the memory cells in the erase state E. An operation for programming the LSB page data to the memory cells in the erase state E may be a first program operation $1^{st}$ PGM.

In other words, before the foggy-fine program operation is performed, the LSB page data may be programmed to the memory cells. Accordingly, when the LSB page data is programmed to the memory cells in the erase state E, the memory cells may change to be in the erase state E or a pre-program state LP.

A subsequent program operation to be performed may be a second program operation $2^{nd}$ PGM. The second program operation $2^{nd}$ PGM may include a foggy program operation and a fine program operation.

According to an embodiment, the semiconductor memory device 100, shown in FIG. 1, may receive a foggy program command corresponding to a foggy-fine program request from the memory controller 200 shown in FIG. 1 and perform a foggy program operation. As a result of the foggy program operation, the memory cells in the erase state E may be programmed to the first to third program states P1 to P3 and the memory cells in the pre-program state LP may be programmed to the fourth to seventh program states P4 to P7.

When the foggy program operation is completed, the semiconductor memory device 100, shown in FIG. 1, may receive a fine program command corresponding to a foggy-fine program request from the memory controller 200, shown in FIG. 1, and perform a fine program operation.

According to an embodiment, threshold voltage distributions of the memory cells in the erase state E and the first to seventh program states P1 to P7 may be controlled more minutely by the fine program operation compared to the foggy program operation. In other words, even when the memory cells in the erase state E and the first to seventh program states P1 to P7 are programmed by the foggy program operation, the threshold voltage distributions of the memory cells are not clearly distinguishable from each other. However, the threshold voltage distributions of the memory cells in the erase state E and the first to seventh program states P1 to P7 may be clearly distinguishable from each other by performing the fine program operation.

As a result, when the semiconductor memory device 100, shown in FIG. 1, performs the foggy-fine program operation after the LSB page data is programmed to the memory cells, operations corresponding to the foggy program command and the fine program command are performed on the memory cells such that each of the memory cells may have one of the erase state E and the first to seventh program states P1 to P7.

At step S43, parity data of the normal data stored in the selected page of the normal sub-block may be programmed to a backup block. For example, the backup controller 150 of the control logic 130 may control the peripheral circuit 120 to program the parity data to the backup block. The parity data may be transmitted along with the normal data when the normal data is transmitted from the memory controller 200, shown in FIG. 1, to the semiconductor memory device 100, shown in FIG. 1, and the memory controller 200, shown in FIG. 1, may generate the parity data by using the normal data.

The parity data may be programmed to a predetermined page of the backup block.

Referring to FIG. 6, parity data PD may be programmed to a predetermined page including memory cells corresponding to the word line WL9, among the memory cells included in the plurality of memory strings ST1 to ST3, included in the second sub-block SUB_2.

At step S45, the above-described step S41 may be checked to determine if a sudden loss of power, for example, a sudden power off (SPO), has occurred. In other words, the control logic 130 may check whether a program fail, such as an SPO, occurs when the program operation is performed.

If an SPO does not occur (a result of S45=No) in the above-described step S45 and steps S41 and S43 are normally completed, the normal data may be programmed to a next page at step S47.

For example, the control logic 130 may control the peripheral circuit 120 to program the normal data D to the next page in the first sub-block SUB_1, that is, a page corresponding to the word line WL2. A program operation of programming the normal data D to the next page in the normal sub-block, that is, the first sub-block SUB_1, may be performed as a foggy-fine program operation.

If an SPO occurs (a result of S45=Yes) in the above-described step S45, a program fail may occur in step S41. For example, an SPO may occur when the program operation of programming the normal data D to a page including memory cells corresponding to the word line WL2 is performed, resulting in a program fail.

If an SPO occurs (a result of S45 is Yes) in step S45, dummy data DD may be programmed to an open region of the selected page at step S49. For example, the control logic 130 may program the dummy data DD to memory cells corresponding to the open region where the program operation is not completed during the program operation of programming the normal data D to the page including the memory cells corresponding to the word line WL2.

The memory cells corresponding to the word line WL2 may be in a state in which the first program operation $1^{st}$ PGM of the foggy-fine program operation is completed. In the above-described state, the LSB page data may be programmed to the memory cells corresponding to the word line WL2. At step S49, the LSB page data programmed to the memory cells corresponding to the word line WL2, as backup data, may be programmed to a selected page (for example, a page corresponding to the word line WL10) of a backup block, that is, the second sub-block SUB_2. For example, the backup controller 150 may control the peripheral circuit 120 to program the LSB page data to be programmed, as the backup data, to the selected page (for example, the page corresponding to the word line WL10) of the backup block, that is, the second sub-block SUB_2, during the program operation of programming the normal data in which an SPO occurs.

As described above, when the program operation of programming the normal data in which an SPO occurs is performed, the LSB page data to be programmed, as backup data, may be stored in the backup block, that is, the second sub-block SUB_2. Therefore, the program operation that is suspended by the SPO may be resumed by using the parity data PD stored in the backup block, that is, the second sub-block SUB_2, and the LSB page data stored in the normal sub-block, that is, the first sub-block SUB_1 during a data recovery operation after the SPO occurs.

According to another embodiment, at step S49, the LSB page data and most significant bit (MSB) page data, among data to be programmed to the memory cells corresponding to the word line WL2, as backup data, may be programmed to the selected page (for example, the page corresponding to the word line WL10) of the backup block, that is, the second sub-block SUB_2. Alternatively, at step S49, the LSB page data, central significant bit (CSB) page data, and the MSB page data, among data to be programmed to the memory cells corresponding to the word line WL2, as backup data, may be programmed to the selected page (for example, the page corresponding to the word line WL10) of the backup block, that is, the second sub-block SUB_2.

Figure 7:
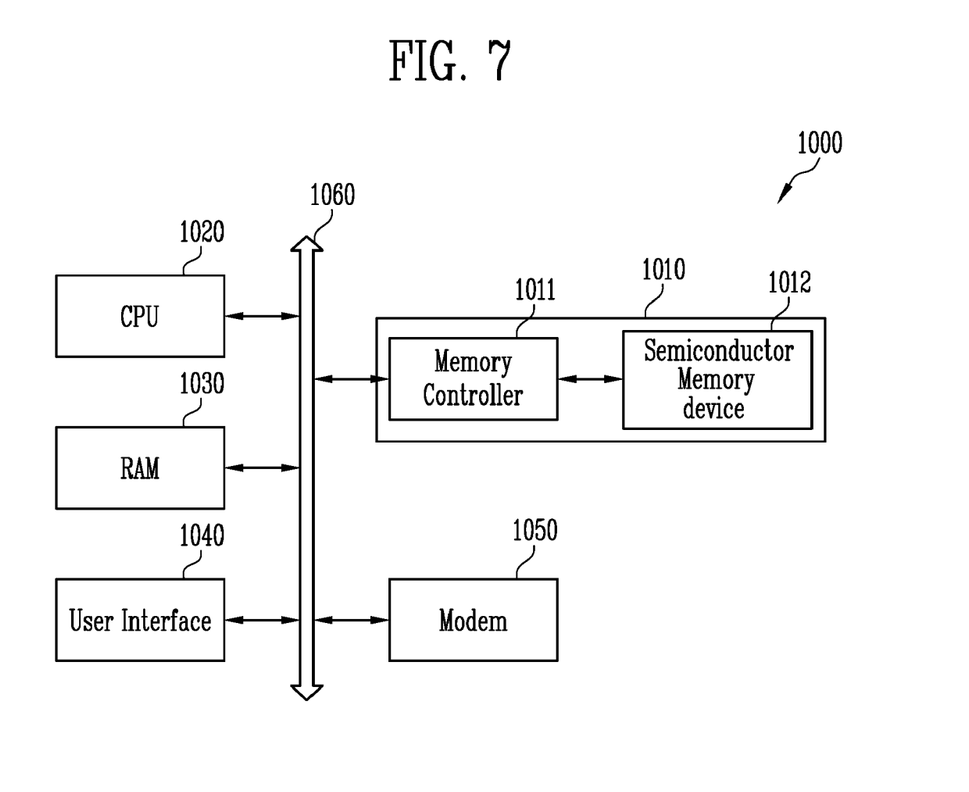
FIG. 7 is a block diagram illustrating a configuration of a computing system according to an embodiment.

FIG. 7 is a block diagram illustrating a configuration of a computing system 1000 according to an embodiment.

Referring to FIG. 7, the computing system 1000 according to the embodiment may include a central processing unit (CPU) 1020, Random Access Memory (RAM) 1030, a user interface 1040, a modem 1050, and a memory system 1010 that are electrically coupled to a system bus 1060. In addition, when the computing system 1000 is a mobile device, a battery for supplying an operating voltage to the computing system 1000 may be further included, and an application chipset, a camera image processor (CIS), mobile DRAM, and the like may be further included.

The memory system 1010 may include a semiconductor memory device 1012 and a memory controller 1011. The semiconductor memory device 1012 may be configured as the semiconductor memory device 100 described above with reference to FIG. 2.

It will be apparent to those skilled in the art that various modifications can be made to the above-described embodiments of the present invention without departing from the spirit or scope of the invention. Thus, it is intended that the present invention cover all such modifications provided they come within the scope of the appended claims and their equivalents.

According to embodiments of the present disclosure, one memory block may be divided into and defined as a plurality of sub-blocks, one of the plurality of sub-blocks may be allocated to be a backup block, and the remaining sub-blocks, except for the one sub-block allocated to be the backup block, may be allocated to be normal sub-blocks. Backup data may be programmed to the backup block during a program operation of programming normal data to the normal sub-blocks. Accordingly, when a program fail occurs due to a sudden loss of power during the program operation of programming the normal data, the program operation of programming the normal data may be resumed using the backup data stored in the backup block.

What is claimed is:

1. A semiconductor memory device, comprising:
   a memory block including a plurality of sub-blocks;
   a peripheral circuit configured to perform a program operation on the memory block; and
   control logic configured to control the peripheral circuit to perform the program operation on the memory block,
   wherein the program operation comprises:
      programming normal data to a first sub-block, allocated to be a normal sub-block, among the plurality of sub-blocks; and
      programming parity data of the normal data to a second sub-block, allocated to be a backup block, among the plurality of sub-blocks,
   wherein the memory block includes a plurality of memory strings coupled between a plurality of bit lines and a source line,
   wherein each of the plurality of sub-blocks is coupled to each of a plurality of word line groups coupled to the memory block, and
   wherein, when a sudden loss of power occurs during the program operation, the control logic is configured to control the peripheral circuit to program dummy data to an open region of a selected page of the first sub-block on which the program operation is being performed.

2. The semiconductor memory device of claim 1, wherein, when a program fail occurs during the program operation, the control logic is configured to control the peripheral circuit to program the normal data, as backup data, to the second sub-block.

3. The semiconductor memory device of claim 2, wherein the backup data includes least significant bit (LSB) page data of the normal data.

4. The semiconductor memory device of claim 2, wherein the backup data includes LSB page data and most significant bit (MSB) page data of the normal data.

5. The semiconductor memory device of claim 2, wherein the backup data includes LSB page data, central significant bit (CSB) page data, and MSB page data of the normal data.

6. The semiconductor memory device of claim 1, wherein the control logic is configured to control the peripheral circuit to program the parity data to a predetermined location of the second sub-block.

7. The semiconductor memory device of claim 1, wherein the control logic includes a backup controller configured to control the peripheral circuit to program the parity data and backup data to the second sub-block.

8. The semiconductor memory device of claim 1,
wherein the first sub-block includes memory cells corresponding to a first word line group, among a plurality of word lines coupled to the memory block, and
wherein the second sub-block includes memory cells corresponding to a second word line group, among the plurality of word lines.

9. A semiconductor memory device, comprising:
a memory cell array including a plurality of memory blocks, wherein each of the plurality of memory blocks includes at least one normal sub-block and a backup block;
a peripheral circuit configured to perform a program operation on a selected memory block, among the plurality of memory blocks; and
control logic configured to control the peripheral circuit to:
program normal data to the at least one normal sub-block during the program operation on the selected memory block; and
program backup data of the normal data to the backup block when a program fail occurs during the program operation,
wherein each of the plurality of memory blocks includes a plurality of memory strings coupled between a plurality of bit lines and a source line,
wherein each of the at least one normal sub-block and the backup block is coupled to each of a plurality of word line groups respectively coupled to the plurality of memory blocks, and
wherein, when a sudden loss of power occurs during the program operation, the control logic is configured to control the peripheral circuit to program dummy data to an open region of a selected page of the first sub-block on which the program operation is being performed.

10. The semiconductor memory device of claim 9, wherein the backup data includes least significant bit (LSB) page data of the normal data.

11. The semiconductor memory device of claim 9, wherein the backup data includes most significant bit (MSB) page data of the normal data.

12. The semiconductor memory device of claim 9, wherein the backup data includes LSB page data and MSB page data of the normal data.

13. The semiconductor memory device of claim 9, wherein the backup data includes LSB page data, central significant bit (CSB) page data, and MSB page data of the normal data.

14. The semiconductor memory device of claim 9, wherein the control logic is configured to control the peripheral circuit to program parity data of the normal data to the backup block during the program operation on the selected memory block.

15. A method of operating a semiconductor memory device, the method comprising:
programming normal data to a first sub-block, among the first sub-block and a second sub-block that are included in a memory block;
storing parity data of the normal data in the second sub-block; and
storing backup data of the normal data in the second sub-block when a program fail occurs during the programming of the normal data,
wherein the memory block includes a plurality of memory strings coupled between a plurality of bit lines and a source line,
wherein each of the first sub-block and the second sub-block is coupled to each of a plurality of word line groups coupled to the memory block, and
wherein, when a sudden loss of power occurs during the programming of the normal data, dummy data is programmed to an open region of a selected page of the first sub-block on which the programming of the normal data is being performed.

16. The method of claim 15, wherein the backup data includes least significant bit (LSB) page data of the normal data.

17. The method of claim 15, wherein the backup data includes LSB page data and most significant bit (MSB) page data of the normal data.

18. The method of claim 15, wherein the backup data includes LSB page data, central significant bit (CSB) page data, and MSB page data of the normal data.

19. The method of claim 15,
wherein the first sub-block includes memory cells corresponding to a first word line group, among a plurality of word lines coupled to the memory block, and
wherein the second sub-block includes memory cells corresponding to a second word line group, among the plurality of word lines.

* * * * *